US008231002B2

(12) United States Patent
Stemmle

(10) Patent No.: US 8,231,002 B2
(45) Date of Patent: Jul. 31, 2012

(54) MAILPIECE CONTAINER FOR STACKING MIXED MAIL AND METHOD FOR STACKING MAIL THEREIN

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 118 days.

(21) Appl. No.: 12/390,105

(22) Filed: Feb. 20, 2009

(65) Prior Publication Data

US 2009/0152804 A1 Jun. 18, 2009

Related U.S. Application Data

(62) Division of application No. 11/487,203, filed on Jul. 13, 2006, now Pat. No. 7,527,261.

(51) Int. Cl.

| | |
|---|---|
| ***B65D 21/00*** | (2006.01) |
| ***B65H 31/00*** | (2006.01) |
| ***B65G 1/00*** | (2006.01) |
| ***B65B 69/00*** | (2006.01) |

(52) U.S. Cl. ........ 206/509; 206/504; 206/505; 206/507; 206/511; 206/512; 206/519; 206/520; 271/207; 414/332

(58) Field of Classification Search .................. 220/781; 206/509, 504, 505, 507, 511, 512, 519, 520; 271/207; 298/24, 35 M; 414/163, 216, 332, 414/407

See application file for complete search history.

(56) References Cited

U.S. PATENT DOCUMENTS

| | | | |
|---|---|---|---|
| 2,852,157 | A | 9/1958 | Frater |
| 2,994,457 | A | 8/1961 | Fornas |
| 3,113,680 | A | 12/1963 | Frater et al. |
| 3,137,499 | A | 6/1964 | Maidment |
| 3,170,594 | A | 2/1965 | Nascher |
| 3,341,063 | A | 9/1967 | Voorhees, Jr. |
| 3,404,804 | A | 10/1968 | Frater et al. |
| 3,420,368 | A | 1/1969 | Sorrells |
| 3,452,509 | A | 7/1969 | Hauer |

(Continued)

FOREIGN PATENT DOCUMENTS

| | | |
|---|---|---|
| JP | 1159088 | 6/1989 |

(Continued)

OTHER PUBLICATIONS

"Development of in-process skew and shift adjusting mechanism for paper handling," American Society of Mechanical Engineers http://www.directtextbook.com, 1998.

(Continued)

*Primary Examiner* — Anthony Stashick
*Assistant Examiner* — Madison L Wright
(74) *Attorney, Agent, or Firm* — Marcus P. Efthimiou; Andrew M. Calderon; Roberts Mlotkowski Safran & Cole, P.C.

(57) ABSTRACT

A containment device includes a base, vertical walls extending from the base and an open end for accepting the mailpieces therein. The containment device, furthermore, has a slot formed in at least one of the vertical walls thereof. The containment device also includes a recess extending on an underside of the base between the vertical walls; a lip extending outward from an edge of the vertical walls; detents provided in the lip of opposing vertical walls of the vertical walls; and protrusions extending beyond the base and structured and adapted to mate with detents of a lower container in a stacked configuration of containers.

18 Claims, 8 Drawing Sheets

U.S. PATENT DOCUMENTS

| | | | | |
|---|---|---|---|---|
| 3,478,892 | A | 11/1969 | Lockwood | |
| 3,498,494 | A | 3/1970 | Voorhees, Jr. | |
| 3,534,866 | A * | 10/1970 | Asenbauer | 211/126.2 |
| 3,587,856 | A | 6/1971 | Lemelson | |
| RE27,649 | E | 5/1973 | Levenhagen | |
| 3,750,892 | A | 8/1973 | Grosse | |
| 3,757,939 | A | 9/1973 | Henig | |
| 3,889,811 | A | 6/1975 | Yoshimura | |
| 3,901,797 | A | 8/1975 | Storace | |
| 3,904,516 | A | 9/1975 | Chiba | |
| 3,905,896 | A | 9/1975 | Jackson | |
| 3,933,094 | A | 1/1976 | Murphy | |
| 4,008,813 | A | 2/1977 | Leersnijder | |
| 4,058,217 | A | 11/1977 | Vaughan | |
| 4,106,636 | A | 8/1978 | Ouimet | |
| 4,139,098 | A | 2/1979 | Mollon | |
| D251,586 | S | 4/1979 | Levenhagen | |
| 4,169,529 | A | 10/1979 | Hunter | |
| 4,244,672 | A | 1/1981 | Lund | |
| 4,320,894 | A | 3/1982 | Reist | |
| 4,371,157 | A | 2/1983 | Hunt | |
| 4,498,664 | A | 2/1985 | Reist | |
| 4,507,739 | A | 3/1985 | Haruki | |
| 4,550,837 | A | 11/1985 | Simmons | |
| 4,550,905 | A | 11/1985 | Heiland | |
| 4,570,798 | A | 2/1986 | Wilson | |
| 4,627,540 | A | 12/1986 | Takeda | |
| 4,641,753 | A | 2/1987 | Tamada | |
| 4,688,678 | A | 8/1987 | Zue | |
| 4,738,368 | A | 4/1988 | Shaw | |
| 4,757,890 | A | 7/1988 | Motoda | |
| 4,836,354 | A | 6/1989 | Motoda | |
| 4,868,570 | A | 9/1989 | Davis | |
| 4,874,281 | A | 10/1989 | Bergerioux | |
| 4,891,088 | A | 1/1990 | Svyatsky | |
| 4,895,242 | A | 1/1990 | Michel | |
| 4,905,986 | A | 3/1990 | Muller | |
| 4,921,107 | A | 5/1990 | Hofer | |
| 4,923,022 | A | 5/1990 | Hsieh | |
| 4,965,829 | A | 10/1990 | Lemelson | |
| 4,987,634 | A | 1/1991 | Weihrauch | |
| 5,031,223 | A | 7/1991 | Rosenbaum | |
| 5,042,667 | A | 8/1991 | Keough | |
| 5,071,008 | A | 12/1991 | Hradisky | |
| 5,119,954 | A | 6/1992 | Svayatsky | |
| 5,144,895 | A * | 9/1992 | Murray | 105/286 |
| 5,186,336 | A | 2/1993 | Pippin | |
| 5,226,641 | A | 7/1993 | Schieleit | |
| 5,291,002 | A | 3/1994 | Agnew | |
| 5,295,674 | A | 3/1994 | Zoltner | |
| 5,413,324 | A | 5/1995 | Flade | |
| 5,445,397 | A | 8/1995 | Evans | |
| 5,470,427 | A | 11/1995 | Mikel | |
| 5,480,032 | A | 1/1996 | Pippin | |
| 5,503,388 | A | 4/1996 | Guenther et al. | |
| 5,549,359 | A * | 8/1996 | Hoss et al. | 298/35 M |
| 5,667,078 | A | 9/1997 | Walach | |
| 5,718,321 | A | 2/1998 | Brugger | |
| 5,797,249 | A | 8/1998 | Hartness | |
| 5,860,527 | A | 1/1999 | Frankenberg et al. | |
| 5,881,902 | A * | 3/1999 | Ackermann | 206/509 |
| 5,981,891 | A | 11/1999 | Yamashita | |
| 6,047,853 | A | 4/2000 | Frankenberg | |
| 6,062,388 | A | 5/2000 | Ohayon | |
| 6,126,017 | A | 10/2000 | Hours | |
| 6,170,689 | B1 * | 1/2001 | Flesher et al. | 220/7 |
| 6,189,695 | B1 * | 2/2001 | Ching-rong | 206/509 |
| 6,227,378 | B1 | 5/2001 | Jones | |
| 6,276,509 | B1 | 8/2001 | Schuster | |
| 6,347,710 | B1 | 2/2002 | Ryan | |
| 6,365,862 | B1 | 4/2002 | Miller | |
| 6,394,274 | B1 | 5/2002 | Cheeseman | |
| 6,394,449 | B1 | 5/2002 | Reist | |
| 6,403,906 | B1 | 6/2002 | De Leo | |
| 6,435,353 | B2 | 8/2002 | Ryan | |
| 6,435,583 | B1 | 8/2002 | Reist | |
| 6,443,311 | B2 | 9/2002 | Hendrickson | |
| 6,464,067 | B1 | 10/2002 | Reist | |
| 6,527,122 | B1 | 3/2003 | Taylor | |
| 6,561,339 | B1 | 5/2003 | Olson | |
| 6,561,360 | B1 | 5/2003 | Kalm | |
| 6,612,563 | B1 | 9/2003 | Noll, Jr. | |
| 6,634,846 | B1 | 10/2003 | Enenkel | |
| 6,677,548 | B2 | 1/2004 | Robu | |
| 6,726,201 | B2 | 4/2004 | Studer | |
| 6,746,202 | B2 | 6/2004 | Mader | |
| 6,747,231 | B1 | 6/2004 | Bretschneider | |
| 6,749,268 | B1 * | 6/2004 | Wheeler et al. | 298/35 M |
| 6,762,384 | B1 | 7/2004 | Kechel | |
| 6,814,210 | B1 | 11/2004 | Hendzel | |
| 6,880,705 | B2 | 4/2005 | Otting et al. | |
| 6,897,395 | B2 | 5/2005 | Shiibashi | |
| 6,946,612 | B2 | 9/2005 | Morikawa | |
| 6,953,906 | B2 | 10/2005 | Burns | |
| 6,976,675 | B2 | 12/2005 | Gosslinghoff | |
| 6,994,220 | B2 | 2/2006 | Schererz | |
| 7,004,396 | B1 | 2/2006 | Quine | |
| 7,111,742 | B1 | 9/2006 | Zimmermann | |
| 7,112,031 | B2 | 9/2006 | Harres | |
| 7,138,596 | B2 | 11/2006 | Pippin | |
| 7,170,024 | B2 | 1/2007 | Burns | |
| 7,210,893 | B1 | 5/2007 | Overman | |
| 7,227,094 | B2 | 6/2007 | Oexle | |
| 7,235,756 | B2 | 6/2007 | De Leo | |
| 7,259,346 | B2 | 8/2007 | Svyatsky | |
| 7,304,260 | B2 | 12/2007 | Boller | |
| 7,378,610 | B2 | 5/2008 | Umezawa | |
| 7,396,011 | B2 | 7/2008 | Svyatsky | |
| 7,397,010 | B2 | 7/2008 | Wilke | |
| 7,397,011 | B2 | 7/2008 | Berdelle-Hilge | |
| 7,527,261 | B2 | 5/2009 | Stemmle | |
| 7,721,891 | B2 | 5/2010 | Dubois | |
| D621,619 | S | 8/2010 | Ripoll | |
| 7,784,615 | B2 | 8/2010 | Stahl | |
| 2002/0053533 | A1 | 5/2002 | Brehm | |
| 2002/0125177 | A1 | 9/2002 | Burns | |
| 2002/0139726 | A1 | 10/2002 | Roth | |
| 2002/0153228 | A1 | 10/2002 | Kramer | |
| 2003/0006174 | A1 | 1/2003 | Harres | |
| 2003/0079626 | A1 | 5/2003 | Yoshitani | |
| 2003/0111468 | A1 * | 6/2003 | Kao | 220/212 |
| 2003/0136713 | A1 | 7/2003 | Lopez | |
| 2003/0155282 | A1 | 8/2003 | Kechel | |
| 2003/0208298 | A1 | 11/2003 | Edmonds | |
| 2003/0209473 | A1 | 11/2003 | Brinkley | |
| 2003/0218296 | A1 | 11/2003 | Honegger | |
| 2003/0218297 | A1 | 11/2003 | Honegger | |
| 2004/0007510 | A1 | 1/2004 | Kechel | |
| 2005/0025340 | A1 | 2/2005 | Hickman | |
| 2005/0096783 | A1 | 5/2005 | Mileaf et al. | |
| 2005/0189270 | A1 | 9/2005 | Lindenmayer | |
| 2005/0222708 | A1 | 10/2005 | Wisniewski | |
| 2006/0070929 | A1 | 4/2006 | Fry | |
| 2006/0124512 | A1 | 6/2006 | Quine | |
| 2006/0180520 | A1 | 8/2006 | Ehrat | |
| 2006/0191822 | A1 | 8/2006 | Avant | |
| 2006/0237341 | A1 | 10/2006 | McDade | |
| 2007/0090029 | A1 | 4/2007 | Avant | |
| 2007/0131593 | A1 | 6/2007 | Burns | |
| 2007/0194519 | A1 | 8/2007 | Belanger | |
| 2007/0272601 | A1 | 11/2007 | Cormack | |
| 2008/0011653 | A1 | 1/2008 | Stemmle | |
| 2008/0012211 | A1 | 1/2008 | Stemmle | |
| 2008/0027986 | A1 | 1/2008 | Stemmle | |
| 2008/0093273 | A1 | 4/2008 | Stemmle | |
| 2008/0093274 | A1 | 4/2008 | Stemmle | |
| 2008/0164185 | A1 | 7/2008 | Stemmle | |

FOREIGN PATENT DOCUMENTS

| | | |
|---|---|---|
| JP | 1271789 | 10/1989 |
| WO | 94/04287 | 3/1994 |
| WO | 01/08817 | 8/2001 |
| WO | PCT/US2005/044406 | 6/2006 |
| WO | PCT/US2005/044560 | 6/2006 |
| WO | PCT/US2005044413 | 6/2006 |

| | | |
|---|---|---|
| WO | PCT/US2006/012861 | 10/2006 |
| WO | PCT/US2006/012888 | 10/2006 |
| WO | PCT/US2006012892 | 10/2006 |

OTHER PUBLICATIONS

Final Office Action dated Jan. 28, 2011 in U.S. Appl. No. 12/390,053.

Final Office Action dated Nov. 12, 2010 in U.S. Appl. No. 12/390,053.

Office Action dated May 13, 2010 in U.S. Appl. No. 12/390,053.

Office Action dated Sep. 17, 2009 in U.S. Appl. No. 12/390,053.

* cited by examiner

MAILPIECE CONTAINER FOR STACKING MIXED MAIL AND METHOD FOR STACKING MAIL THEREIN

CROSS REFERENCE TO RELATED APPLICATIONS

The present application is a divisional application of co-pending U.S. application Ser. No. 11/487,203, filed on Jul. 13, 2006, now U.S. Pat. No. 7,527,261 the contents of which are incorporated by reference herein in their entirety.

TECHNICAL FIELD

The invention disclosed herein relates to containers, and more particularly to a mailpiece container adapted for accepting and stacking mixed mail therein which is sorted into route sequence. The invention also describes a method for stacking mail into such containers using a mixed mail sorter.

BACKGROUND ART

The 2003 Presidential Commission Report on the Future of the USPS concluded that the Postal Service should continue to develop effective merging systems that optimize efficiency, e.g., maximize the number of mailpieces shipped with each mile traveled, while minimizing the labor content associated with mailpiece handling. With respect to the latter, all elements of the mail stream (letters, flats, periodicals, post cards, etc.) should be sorted, merged, and/or sequenced at a centralized location with the expectation that no subsequent handling would be required at each of the local postal branch offices, other than the physical delivery to the recipient address.

Most postal services are actively exploring opportunities to reduce the overall cost of processing mail by investing in postal automation equipment and employing state-of-the-art materials management techniques to improve efficiencies in the various process steps. In some instances, the savings from automation equipment may be, unfortunately, offset by increases in transportation costs.

Sorting equipment typically loads mailpieces by a gravity feed chute which drops mailpieces vertically into mail trays arranged below the chute. Occasionally, especially as the mail trays are nearly completely filled, portions of the mailpieces do not settle properly and partially protrude/extend above the top of the tray. As such, a substantial risk is incurred that the protruding mailpiece will catch on mechanisms related to the automated processing equipment, e.g., one of the tray transporting, storing, and/or retrieving systems. It will, therefore, be appreciated that such interference can damage the mailpiece or, alternatively, require system shut down to rectify the problem/obstruction. Further, the overall efficiency of the mail sortation system is adversely affected by these stacking errors.

Stacking errors can occur as a result of a variety non-optimum conditions and/or under a variety of circumstances. In one instance, a non-uniform thickness profile of the stacked envelopes can lead to one side of the stack being higher in the tray than the opposing side. In yet other instances, the stacking of mixed mail, e.g., a combination of flats-, letter-, and postcard-sized mailpieces, can result in a similar inconsistent or non-level stack profile. It will be appreciated that when mixed mail is aligned along at least one edge, letter and postcard-sized envelopes, which may be less than one-half the length of flats mailpieces, will leave a thickness void in regions where a flat envelope would otherwise extend the full length and maintain uniform thickness of the stack.

To address the difficulties associated with stacking errors, mailpiece equipment manufacturers have typically employed one of two known methods/solutions. Firstly, the tray capacity may be limited to about 70% of the total potential capacity. As such, the probability that a mailpiece will protrude beyond the bounds of the container is significantly diminished. Many of the current sorters are equipped with sensors to determine when the height of the mailpiece stack reaches seventy percent (70%) of full level. Secondly, sensors may be deployed throughout the tray transport system to detect when or if mailpieces protrude beyond the top of the container/tray. Trays which have been over-filled are typically diverted to a secondary track for an operator to manually correct the stacking error and return the tray to the primary or principle track.

While these solutions eliminate difficulties associated with equipment jamming or malfunction, the mailpiece container trays are not filled to full capacity. As a result, the containers are shipped with thirty percent (30%) of its volume in air rather than in mailpiece content material. Additionally, the labor cost in operating multi-million dollar sorting equipment remains high due to the human intervention required to correct the stacking errors.

A need, therefore, exists for a system and method to accommodate mixed mail, including mail of inconsistent thickness, to optimally fill mail containers/trays.

BRIEF DESCRIPTION OF THE DRAWINGS

The accompanying drawings illustrate presently preferred embodiments of the invention, and, together with the general description given above and the detailed description given below, serve to explain the principles of the invention. As shown throughout the drawings, like reference numerals designate like or corresponding parts.

SUMMARY OF THE INVENTION

Figure 1:
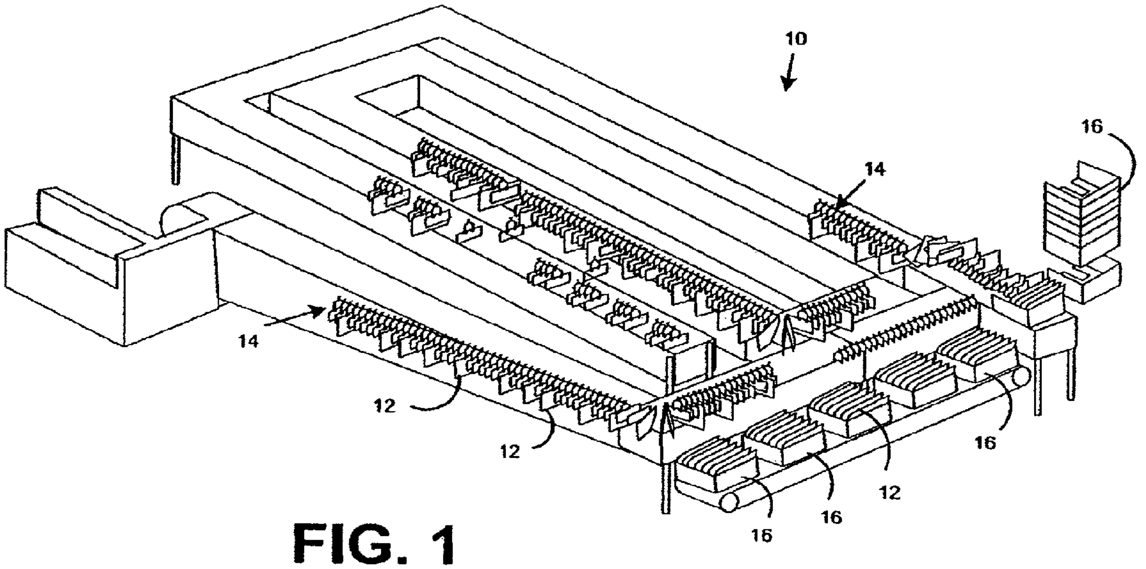
FIG. 1 is a perspective view of a mixed mail sorter having a plurality of escort assemblies for securing, diverting, transporting and releasing mailpieces of mixed variety.

A system is provided for stacking mail having an escort assembly for handling each mailpiece. The system comprises a containment device, a transport mechanism and a detachment mechanism. The containment device includes a base, vertical walls extending from the base and an open end for accepting the mailpieces therein. The containment device, furthermore, has a slot formed in at least one of the vertical walls thereof. The transport mechanism includes first and second transport segment, the first transport segment conveying escort assemblies and respective mailpieces over an open end of the containment device and the second transport segment lowering the escort assemblies and respective mailpieces into the open end of the containment device. The transport mechanism furthermore aligns the edges of the mailpieces along one of the vertical walls of the containment device and positions the escort assembly through the slot of the containment device. The detachment mechanism is operative to release the mailpieces from the respective escort assembly and move the escort assemblies through the slot of the containment device.

DETAILED DESCRIPTION

The present invention is described in the context of a mixed mail sorter for sorting mailpieces and then automatically stacking them into a plurality of mail trays. While the invention is advantageous for mixed mail sorters, it should be appreciated, that the system and method for stacking mailpieces is applicable to any apparatus which may employ an escort assembly for securing, conveying and depositing objects into a container, whether the container is intended for delivering mail, storing objects and/or stacking objects/mail in a containment device.

The invention describes a system for stacking mail into a containment device wherein the mail previously sorted may be stacked after sorting is completed. In the context used herein, the term "containment device" means a container for stacking mail along at least one edge, whether or not the container is used in the transport of mail, i.e., in a transport vehicle, or an interim container used to stack/align the mail and subsequently depositing the mailpieces in yet another transport container. Furthermore, the invention describes various modifications made to such a containment device for use in combination with a mixed mail sorter. That is, inasmuch as mixed mail sorters of the type described utilize a plurality of escort assemblies to secure, divert, transport and release objects/mailpieces into the containment device, various structural modifications are made to accommodate automated stacking therein. Moreover, such modifications may be made to maintain alignment of the objects/mailpieces while being transported i.e., subject to abrupt accelerations and/or vibrations during vehicle transport.

Co-pending, commonly-owned U.S. patent application Ser. No. 11/487,202 entitled "Apparatus and Method for Positioning Objects/Mailpieces" describes an apparatus for centering objects/mailpieces within an escort/clamp assembly for use in a mixed mail sorter. The mixed-mail sorter is described in greater detail in co-pending, commonly owned US patent applications: PCT/US2005/044560 (WO 2006/063204) (corresponding to U.S. Ser. No. 11/885,231; PCT/US2005/044413 (WO 2006/063125) (corresponding to U.S. Ser. No. 11/885,242); PCT/US2005/044406 (WO 2006/063121) (corresponding to U.S. Ser. No. 11/487,202); PCT/US2006/012892 (WO 2006/110486) (corresponding to U.S. Ser. No. 11/856,174); PCT/US2006/012861 (WO 2006/110465) (corresponding to U.S. Ser. No. 11/856,299); and PCT/US2006/012888 (WO 2006/110484) (corresponding to U.S. Ser. No. 11/856,120, the contents of which are incorporated by reference in their entirety.

FIG. 1 shows a typical mixed mail sorter 10 designed to accept mailpieces 12 into an escort assembly 14. The escort assembly 14 is operative to secure, transport, divert and release the mailpieces into one of a multiplicity of containment devices 16 such as a conventional mail tray. In the context used herein, the term escort assembly means any device which may be used for securing objects/mailpieces, transporting the objects/mailpieces through at least part of a handling operation such as automated mail sorting. In the preferred embodiment, the escort assembly 14 is a clamp assembly; however, the escort assembly 14 may also include wire form cages, movable pocket assemblies (i.e., having a trap door) and similar mechanisms. For the purposes of subsequent discussion, the terms "escort assembly" and "clamp assembly" may be used interchangeably.

Figure 2:
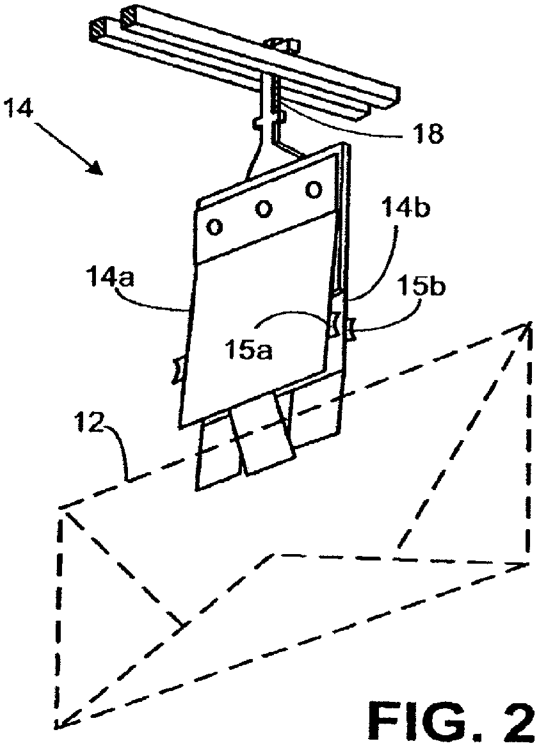
FIG. 2 is an isolated perspective view of an escort assembly for retaining mailpieces wherein the escort assembly is hung from and secured to an overhead transport mechanism.

In FIG. 2, the clamp assembly 14 may include jaws 14*a*, 14*b* which are spring biased to a closed position for holding/securing a mailpiece 12 therein. The jaws 14*a*, 14*b* may be separated to an open position for releasing the mailpiece by a cam mechanism (shown in subsequent views) acting on tabs 15*a*, 15*b* disposed on each side of the jaws 14*a*, 14*b*. The functional operation of the cam mechanism will be discussed in greater detail when discussing the release of each mailpiece into one of the containment devices 16.

In addition to its principle mechanical functions, the clamp assembly 14 may also include a unique identifier 18, e.g., a barcode or RFID chip, to uniquely identify the clamp. As such, the sorting operation may be directed by a controller using a combination of requisite information, i.e., electronically scanned information in connection with the mailpiece (for example, its destination address) together with the unique identifier of the escort assembly. Further, the sorting process may be performed without altering/marking the mailpiece 12 such as via a printed barcode symbology or other identification mark.

Figure 3A:
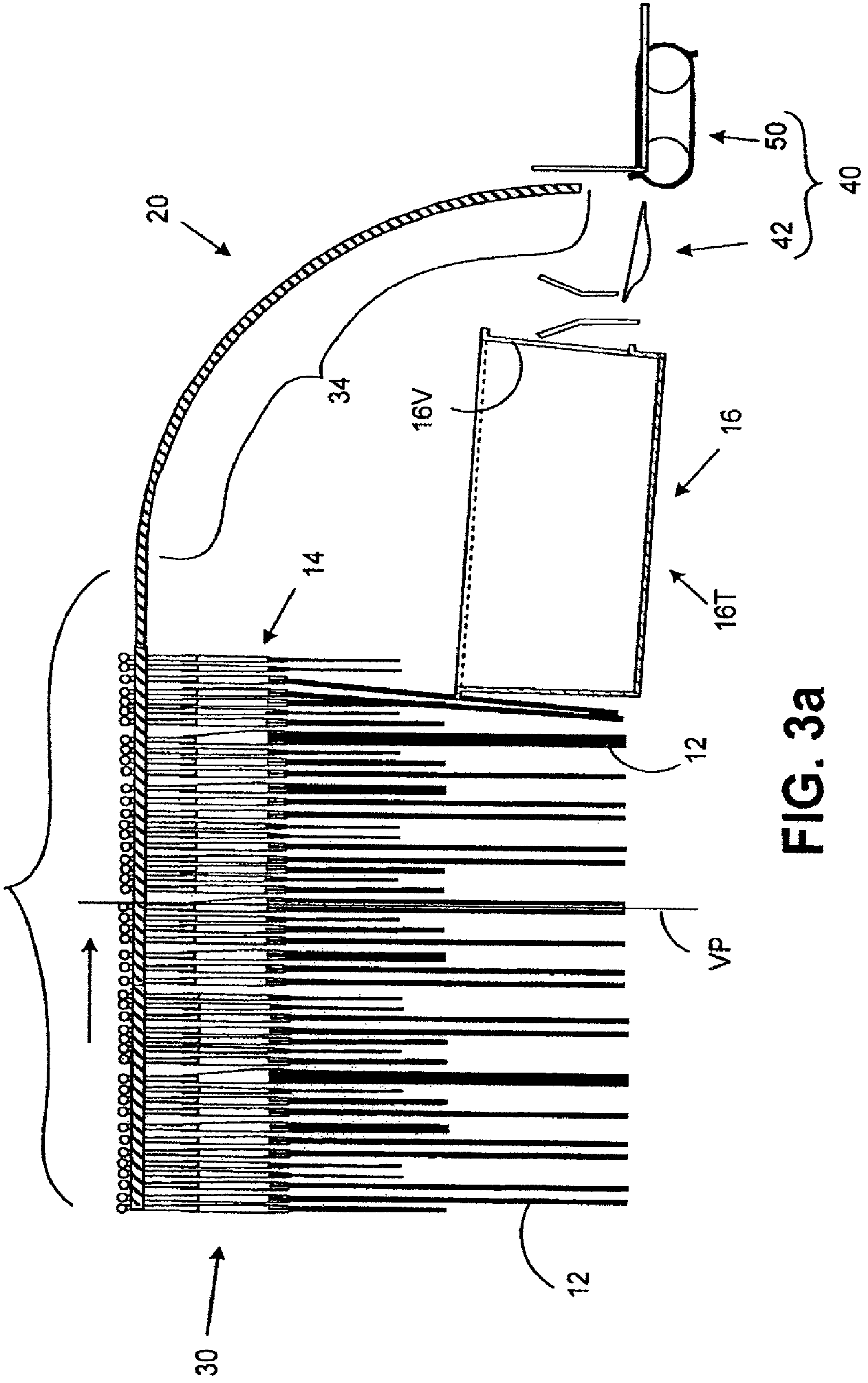
FIGS. 3*a*-3*c* depict side views of a first embodiment of the inventive system in various operational positions, the system including a containment device, a transport mechanism for conveying the escort assemblies over and into an open end of the containment device, and a detachment mechanism.
Figure 3B:
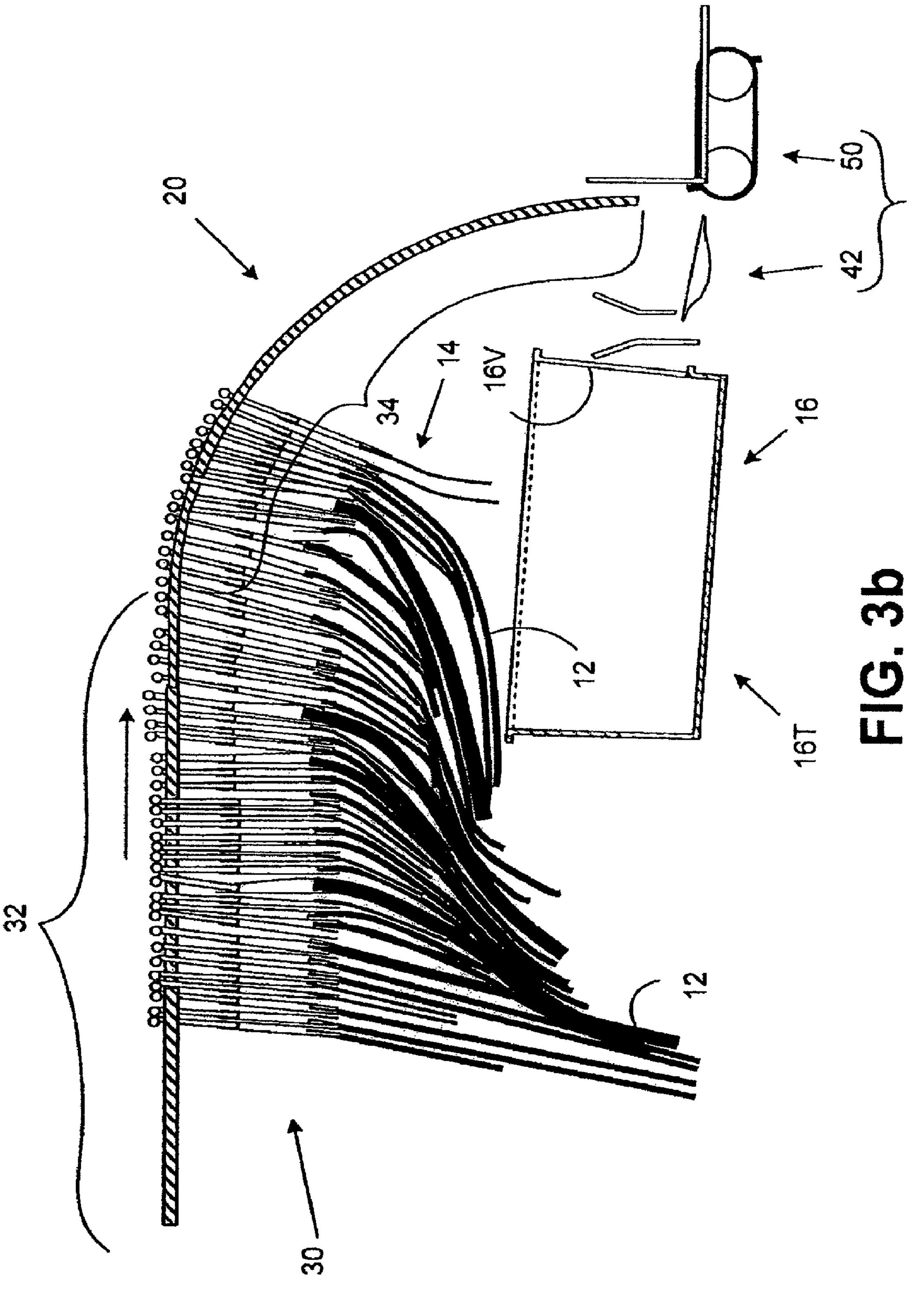
Figure 3C:
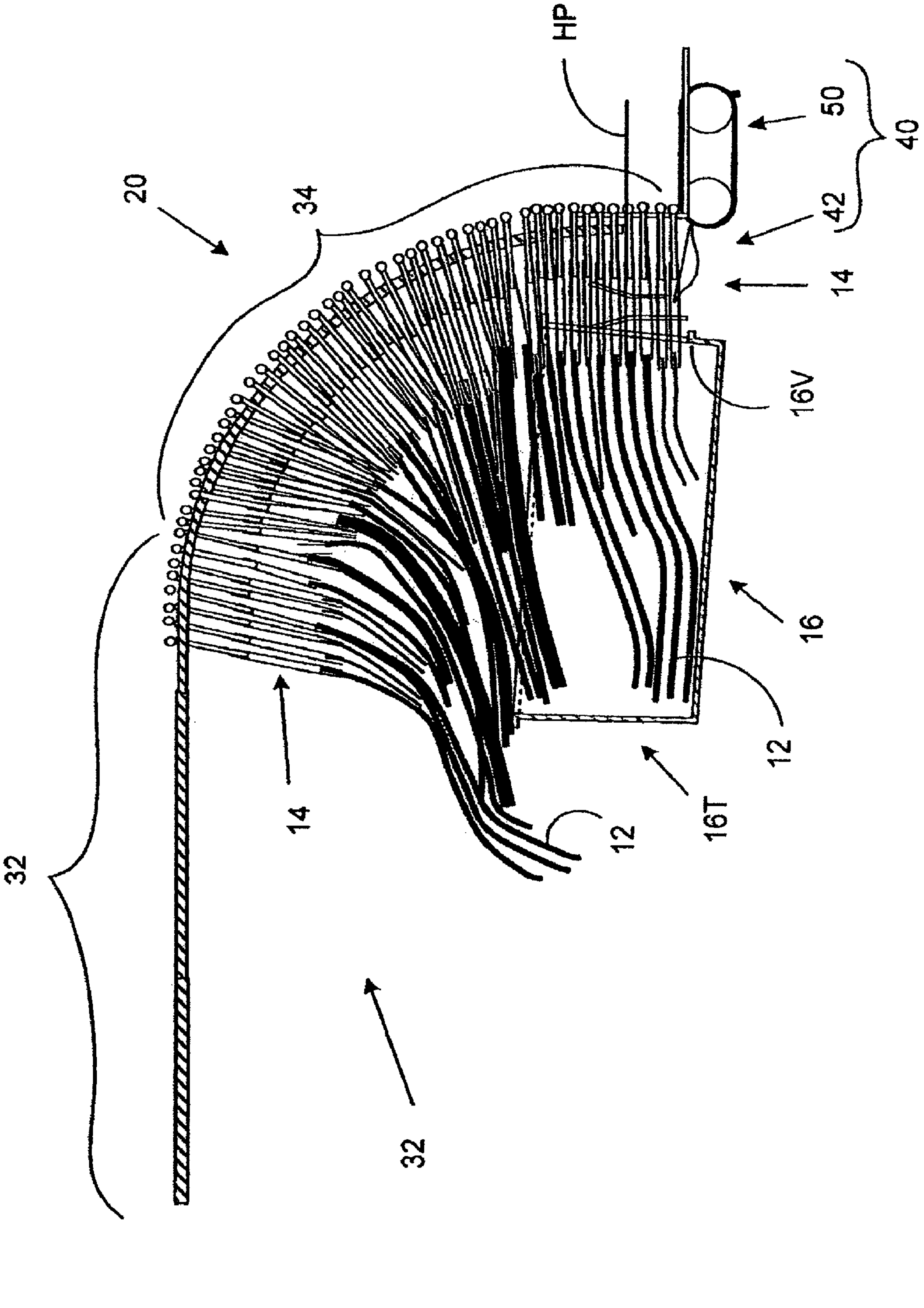

In the broadest sense of the invention and referring to FIGS. 3*a*-3*c*, the system 20 includes a containment device 16 which has been specifically modified or adapted to accept the passage of a clamp assembly 14, a transport mechanism 30 for transporting and conveying mailpieces 12 into an open end of the containment device 16, and a detachment/release mechanism 40 for opening the jaws of the clamp assembly 14 while being moved/pulled through a vertical wall 16V of the containment device 16.

Figure 4:
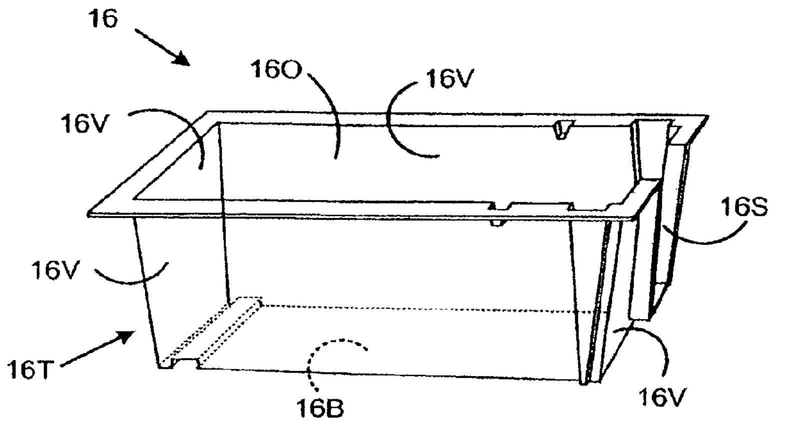
FIG. 4 is an isolated perspective view of a specially adapted transport container for accepting mailpieces from the escort assemblies.

Referring additionally to FIG. 4, the containment device 16 is a transport container 16T which will be subsequently used for delivery of stacked mailpieces in a transport vehicle. Alternatively, the containment device may be an interim container (shown in subsequent views) operative to deposit stacked mailpieces into a subsequent container (which may or may not be used for delivery).

Inasmuch as the transport container 16T will be used repeatedly, it will be necessary for its construction to be sufficiently robust for continuous use in a delivery capacity. More specifically, the transport container 16T includes a base 16B, vertical walls 16V extending from the base 16B and an open end 160 for accepting the mailpieces (not shown in FIG. 4) therein. At least one of the vertical walls 16V defines a vertical slot 16S formed in at least one of the vertical walls 16V thereof. Inasmuch as it will be desirable to stack the mailpieces one atop the other, the transport container 16T includes several abutment surfaces, i.e., recesses and detents (See, e.g., FIGS. 4 and 9), to enable stacking on an angle relative to the horizontal. This transport container stacking feature will be better understood following a discussion of the mailpiece stacking operation, discussed in subsequent paragraphs below.

Returning to FIGS. 3*a*-3*c*, the transport mechanism 30 includes first and second transport segments 32, 34, respectively. The first transport segment 32 is operative to convey the clamp assemblies 14 and the respective mailpieces 12 over the open end 160 of each transport container 16T. The second transport segment 34 is operative to lower the clamp assemblies 14 and the respective mailpieces 12 into the open end 160 of the transport container 16T such that an edge of the mailpieces 12 are aligned along one of the vertical walls 16V of the transport container 16T. Furthermore, the second transport segment 34 changes the orientation of the clamp assembly 14 from a first to a second plane. That is, while the clamp assemblies 14 are conveyed by the first transport segment 32, the mailpieces 12 are aligned in a first, substantially vertical plane VP. As the clamp assemblies 14 transition to the second transport segment 34, the clamp assemblies assume a second orientation and are aligned in a second, substantially horizontal plane HP. While the precise planar position of each of the clamp assemblies 14 can deviate from the reference vertical and horizontal planes VP, HP, it should be understood that the second transport segment can change the planar position of the clamp assemblies 14 from as little as sixty degrees (60.degree.) to as much as one-hundred and twenty degrees (120.degree.). Furthermore, while the first transport segment 32 is shown as being substantially linear and the second transport segment 34 is shown as being substantially arcuate, the transport mechanism 30 may comprise a variety of curvilinear segments to achieve the desired planar orientation of the clamp assemblies 14 and respective mailpieces 12.

In addition to changing the planar orientation of the clamp assemblies, the second transport segment 34 is operative to place the clamp assemblies 14 through the vertical slot 16S of the transport container 16T. That is, a portion of each clamp assembly extends through the slot 16S such that the mailpiece 12 nearly abuts one side of the slotted vertical wall 16V while an outboard portion of the clamp assembly 14 passes through the vertical wall 16V. Furthermore, it should be appreciated that the width dimension of the vertical slot 16S is dictated by the corresponding width dimension of the clamp assemblies 14.

Figure 5:
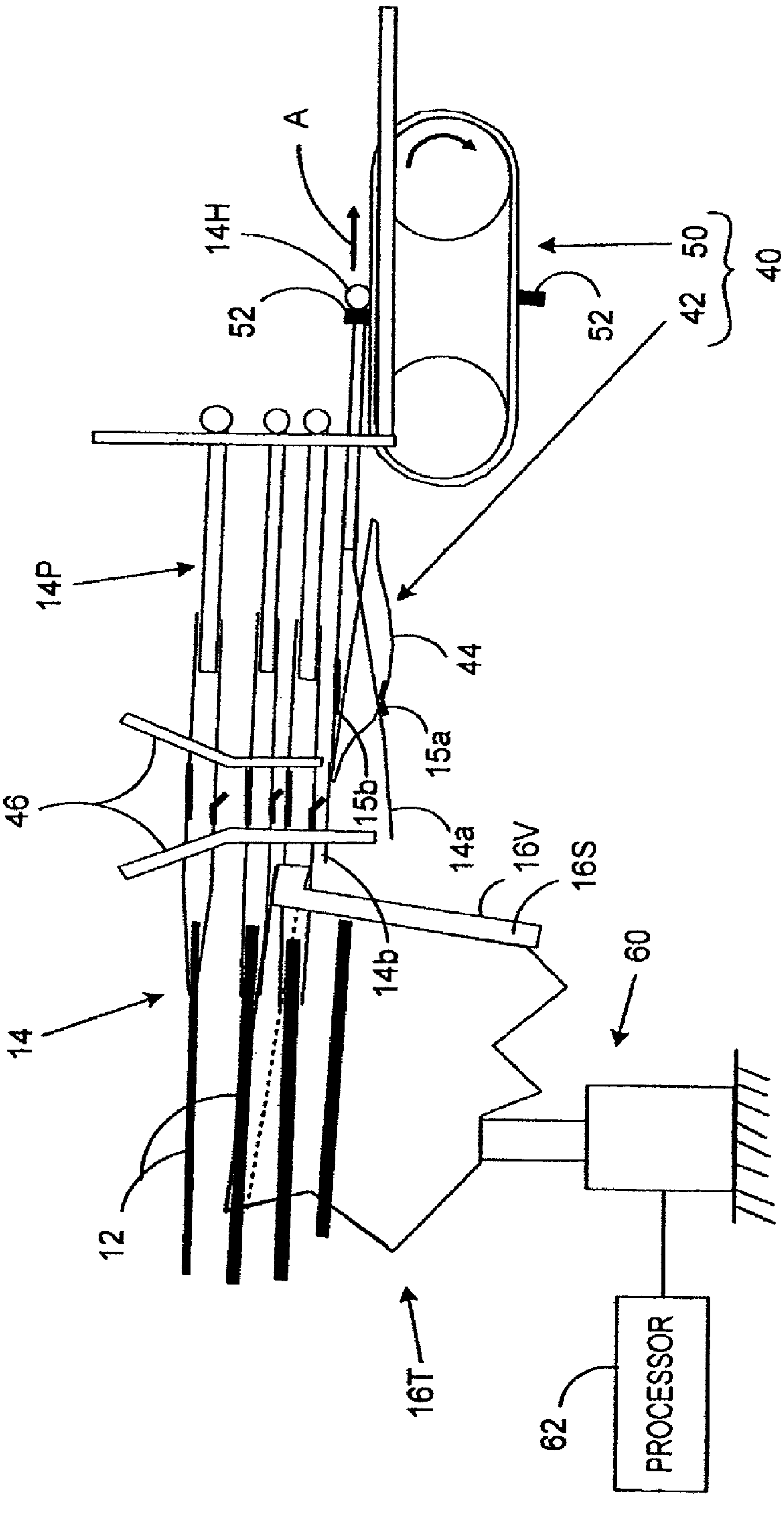
FIG. 5 is an enlarged view of the detachment mechanism for releasing the mailpieces into the containment device.

In FIG. 5, the outboard portion 14P of the clamp assembly 14 is coupled to a detachment mechanism 40 which is operative to release the mailpieces 12 from the clamp assembly 14 and move the clamp assembly through the vertical slot 16S of the transport container 16T. While the detachment mechanism 40 may comprise a variety of structural elements for performing the combined functions, in the described embodiment, a cam mechanism 42 and a conveyor mechanism 50 cooperate to release the mailpiece 12 and pull the clamp assembly 14 through the vertical slot 16S. More specifically, the cam mechanism 42 includes a cam surface 44 which interposes the clamp assembly tabs 15*a*, 15*b*. Additionally, vertically protruding fingers 52 of the conveyor mechanism 50 engage a T-shaped hanger 14H of the clamp assembly 14 to pull the clamp assembly 14 in the direction of arrow A. As the clamp assembly 14 is pulled, the tabs 15*a*, 15*b* of the clamp assembly 14 engage the linear cam surface 44 of the cam mechanism 40. The linear movement of the clamp assembly 14 spreads the jaws 14*a*, 14*b* thereof to release the mailpieces 12, thereby aligning the same along the vertical wall 16V of the transport container 16T. To ensure that the tabs 15*a*, 15*b* are laterally aligned with the cam mechanism 42, a pair of vertical guides 46 may be employed to direct the tabs 15*a*, 15*b* to the tip end of the cam mechanism 42.

To prevent the mailpieces 12 from falling a vertical distance within the transport container 16T, i.e., to the base of the container, and misalignment of the mailpieces 12 as a consequence thereof, the transport container 16T may be positioned to minimize the vertical distance from the clamp assembly 14 to the base 16B of the transport container 16T or to the top of the cumulating stack. More specifically, a mechanism 60, coupled to the transport container 16T, may be employed to raise and/or lower the transport container to ensure that the fill level of the mailpiece stack is consistent with the vertical height of the detachment mechanism 40. Consequently, the mailpieces 12 may be stacked, one on top of another, in a controlled manner, falling only a small vertical distance upon their release from the detachment mechanism.

Additionally, the rate of descent of the transport container 16T may be controlled by a processor 62 based upon previously measured and stored mailpiece thickness information. That is, the system 20 of the present invention may be used in combination with a thickness profile measurement device, such as that disclosed in commonly-owned, co-pending U.S. patent application Ser. No. 11/441,988 entitled, "METHOD FOR OPTIMALLY LOADING OBJECTS INTO STORAGE/TRANSPORT CONTAINERS". The subject matter thereof is hereby incorporated by reference in its entirety. More specifically, the thickness measurement data obtained from the thickness measurement device may be stored in memory and used by the processor 62 to calculate the fill rate of the container 16T. If, for example, the container 16T is to be filled by a plurality of relatively thick magazines and newspapers, the rate of descent may be increased to accommodate the increased fill rate of the mailpieces 12 deposited in the container 16T. On the other hand, if relatively thin conventional envelopes are the representative mix of mail entering the transport container 16T, then the descent rate may be decreased to allow a sufficient thickness of mailpieces 12 to develop before moving the transport container 16T downward.

Figure 6A:
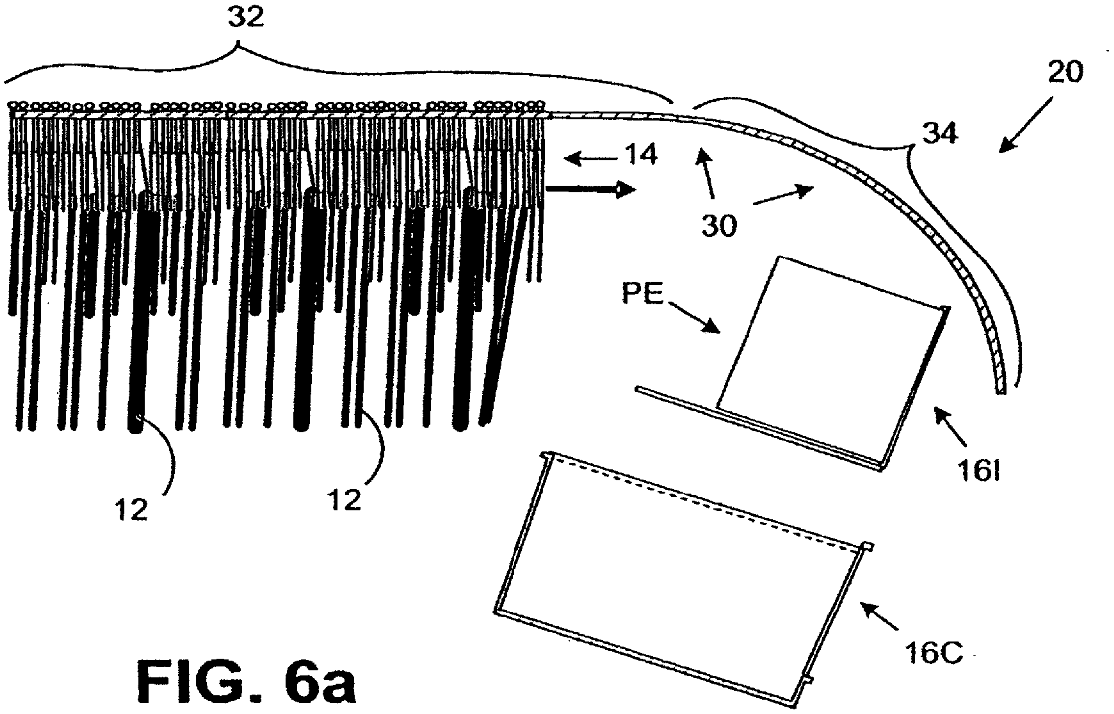
FIGS. 6*a*-6*c* depict a side view of a second embodiment of the inventive system including an interim container for accepting mailpieces from the escort assemblies and depositing the stacked mailpieces into a secondary or subsequent mailpiece container.
Figure 6B:
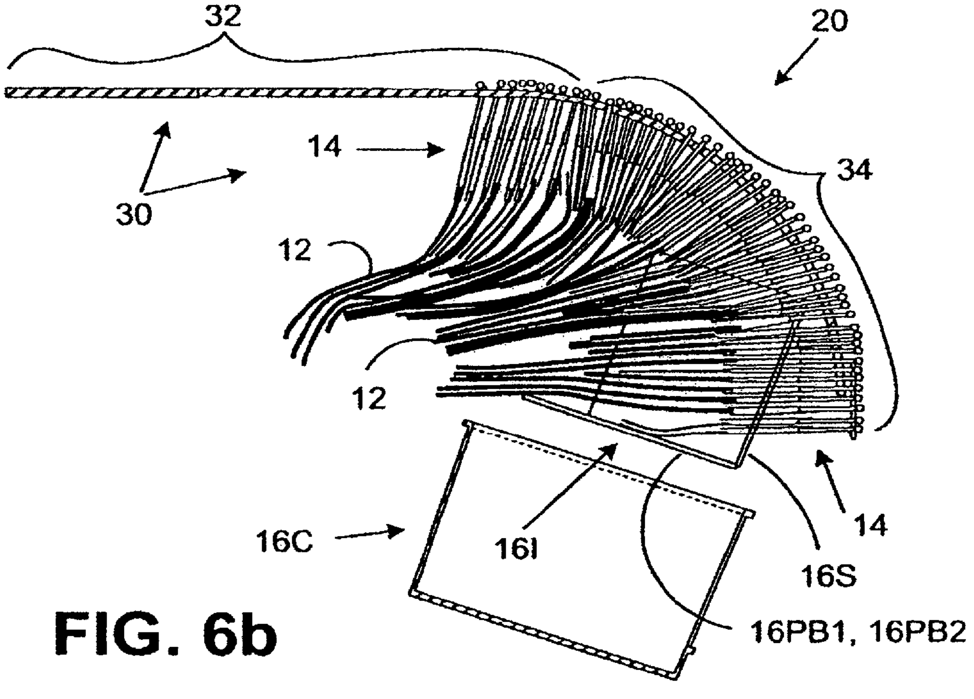
Figure 6C:
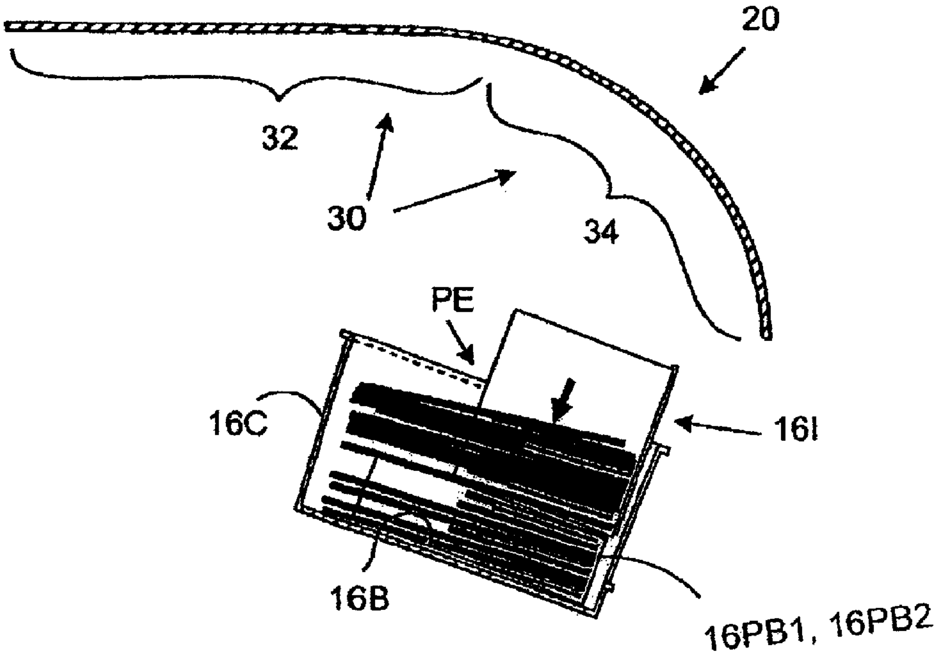
Figure 7:
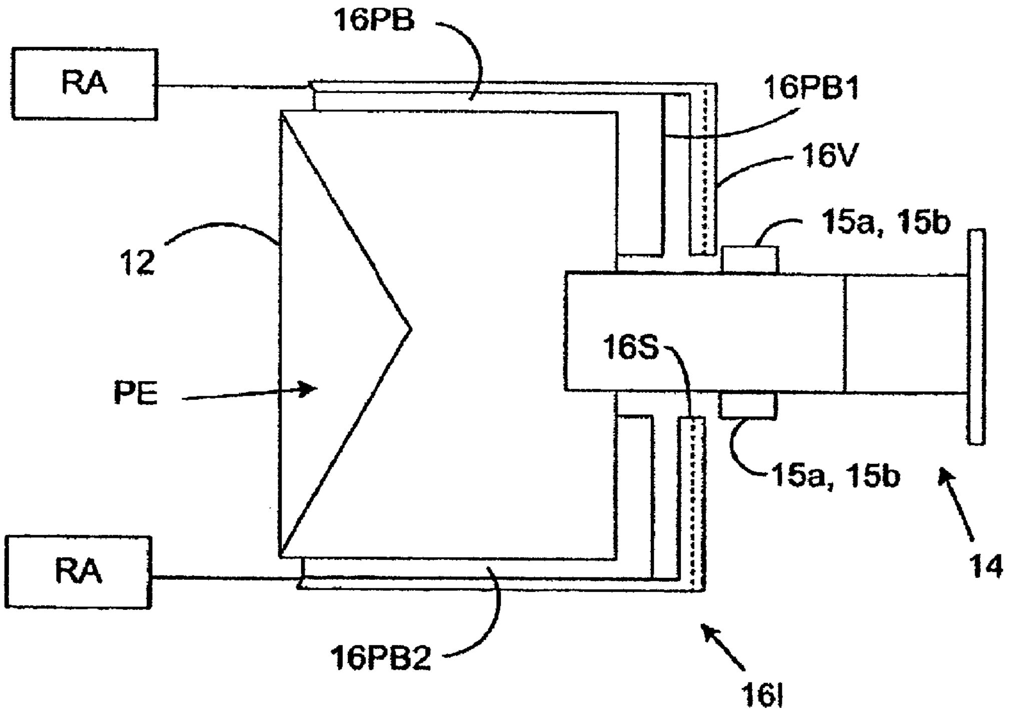
FIG. 7 is a top view of the interim container shown in FIGS. 6*a* through 6*c*.

In yet another embodiment of the invention and referring to FIGS. 6*a*-6*c*, the containment device is an interim container 16I for stacking mailpieces 12 in a first operation and depositing the stacked mailpieces 12 in a conventional mailpiece container 16C. The transport and detachment mechanisms 30 and 40 are the same as those previously described with respect to loading the transport container 16T depicted in FIGS. 3*a*-3*c*. Consequently, no additional discussion is necessary or warranted with respect to these elements. Suffice it to say, that the transport mechanism 30 is operative to convey the clamp assemblies 14 and respective mailpieces 12 over an open end of the interim container 16I, and lower the clamp assemblies 14 and respective mailpieces 12 into the open end of the interim container 16I. Likewise, the detachment mechanism is operative to release the mailpieces 12 from the respective clamp assemblies 14 while moving the clamp assemblies 14 through a slot 16S formed through a vertical wall 16V of the interim container 16I.

Referring to FIGS. 6*a*, 6*b*, 6*c* and 7, the interim container 16I comprises at least one pivotable base 16PB and vertical walls 16V extending from the pivotable base 16PB to define a partial enclosure PE. Inasmuch as the interim container 16I is not used for subsequent mailpiece transport, the aft end of the container 16I is open to facilitate the lowering and stacking of mailpieces 12 within the interim container 16I. While the interim container 16I is being filled, the container 16I is lowered into the mailpiece container 16C such that the stacked mailpieces 12 may be subsequently released into the mailpiece container 16C. More specifically, the pivotable base 16PB may include a pair of trap doors 16PB1, 16PB2 which are pivoted to an open position by rotary actuators RA. As such, the mailpieces are released as a full stack (rather than piece-by-piece) into the mailpiece container 16C disposed below the trap doors 16PB1, 16PB2.

While the interim container 16I may be lowered into the mailpiece container 16C, it should be appreciated that either or both containers 16I, 16C may be spatially positioned to minimize the vertical distance from the trap doors 16PB1, 16PB2 of the interim container 16I to the base 16B of the mailpiece container. After releasing the accumulator stack of mailpieces into container 16C, the interim container is moved back to its initial position, the trap doors 16PB1 and 16PB2 rotated open so that interim container 16I is ready to begin receiving the next batch of mail to be stacked. The filled container 16C is removed and replaced with an empty container.

Figure 8:
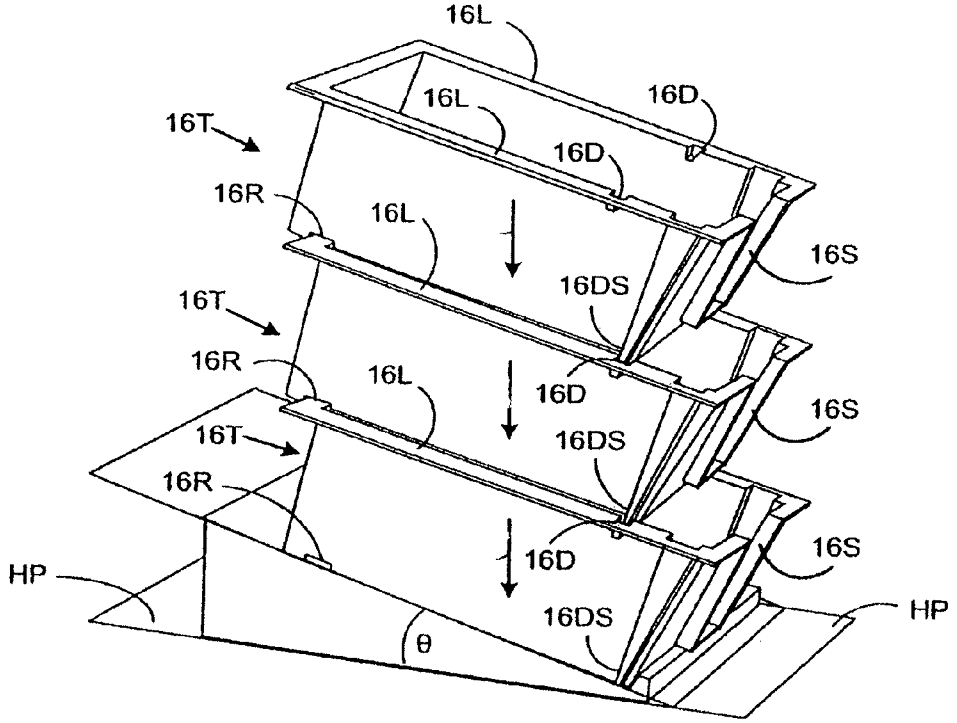
FIG. 8 is a perspective view of several transport containers which have been stacked on an angle relative to the horizontal to mitigate mailpiece movement during transport.

When the mailpieces 12 have been stacked and aligned along an edge or vertical wall of the transport or mailpiece containers 16T, 16C, it is generally desirable to retain alignment of the mailpieces 12. In FIGS. 4 and 8, the transport container 16T has been specifically adapted to maintain mailpiece alignment during transport in a delivery vehicle, i.e., a vehicle subject to vibrations and other perturbations tending to disrupt the order and alignment of the mailpieces 12. As shown more specifically in FIGS. 4 and 8, each container 16 includes a lip 16L, which extends outward about the perimeter of the container 16 (e.g., along an upper edge of the vertical walls 16V). The container 16 also includes a recess 16R along a portion of the base 16B and more specifically extending on a transversely underside of the base between the vertical walls 16V (to each vertical wall). The recess 16R is wider than the lip 16L so that the recess 16R can with a lip 16L of an upper container in a stack of containers (FIG. 8). In addition, a recess or detent 16D is provided in the lip 16L and extends into the vertical wall 16V on both sides of the slot 16S. The container 16 also includes tapered protrusions 16DS (or stops), extending from vertical walls 16V on a same side as the detents 16D. The tapered protrusions 16DS are wider at the lip 16L than the base 16B and extend beyond the vertical walls and/or the base 16B. Also, the tapered protrusions 16DS form a recess within the container. The tapered protrusions 16DS are configured and structured to mate with the respective recess or detent 16D on a lower container, in a stack of containers (See, FIG. 8). As shown in FIG. 8, the containers can be stacked at an angle and slightly offset from one another by the mating of the recesses 16R and the lips 16L and the detents 16D and the protrusions 16DS, respectively.

It is to be understood that all of the present figures, and the accompanying narrative discussions of preferred embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed:

1. A containment device for use in an automated sorting apparatus having a plurality of clamp assemblies for transporting, sorting, and depositing mailpieces in the container, the containment device comprising:

a base and a plurality of vertical walls projecting from the base to define an enclosure for containing mailpieces therein;

at least one of the vertical walls including a vertical slot for accepting a clamp assembly when mailpieces are stacked within the container and when the edges are aligned along the vertical wall of the mailpiece container;

protrusions extending along opposing vertical walls of the plurality of vertical walls;

detents offset from the protrusions and provided with respect to the opposing vertical walls;

a recess extending on an underside of the base entirely between two opposing vertical walls of the vertical walls; and a lip extending beyond the vertical walls, wherein the protrusions are tapered beginning from the lip to the base; and the protrusions extend outwardly from two opposing vertical walls of the vertical walls.

2. The containment device according to claim 1, wherein the slot defines a width dimension greater than a width dimension of the clamp assembly.

3. The containment device according to claim 1, wherein the containment device is a transport container for delivering mailpieces along a delivery route.

4. The containment device according to claim 1, wherein the containment device is an interim container for depositing mailpieces in a transport container.

5. The containment device according to claim 4, wherein the interim container includes at least one pivotable base, an actuator for pivoting the base mechanism from a closed to an open position, and a controller for issuing an input command to the actuator for moving the base mechanism to an open position to deposit the mailpiece from the interim container to a transport container.

6. The containment device according to claim 1, further comprising:

a recess extending on an underside of the base entirely between two opposing vertical walls of the vertical walls;

a lip extending about the vertical walls and within the slot, wherein the lip extends beyond an edge of the vertical walls, wherein:

the detents are formed in the lip of the opposing vertical walls of the vertical walls; and the protrusions are tapered and are partially formed within the lip and extend from a top to the base of the opposing vertical walls of the vertical walls, the tapered protrusions extending outwardly from the base and structured and adapted to mate with the detents of a lower container in a stacked configuration of containers such that when mated the lower container is offset from an upper container.

7. A containment device, comprising:

a base;

vertical walls extending from the base to form an open end for accepting mailpieces;

a recess extending on an underside of the base between the vertical walls;

a lip extending outward from an edge of the vertical walls;

detents provided in the lip of opposing vertical walls of the vertical walls; and protrusions extending beyond the base and structured and adapted to mate with detents of a lower container in a stacked configuration of containers, wherein:

the recess extends on an underside of the base entirely between two opposing vertical walls of the vertical walls;

the lip extends beyond the vertical walls;

the protrusions are tapered beginning from the lip to the base; and the protrusions extend outwardly from two opposing vertical walls of the vertical walls.

8. The containment device according to claim 7, wherein the recess extends across the base to opposing vertical walls.

9. The containment device according to claim 7, further comprising a slot in one of the vertical walls.

10. The containment device according to claim 9, wherein the one of the vertical walls is positioned between vertical walls that include the detents.

11. The containment device according to claim 7, wherein a width of the recess is larger than a width of the lip.

12. The containment device according to claim 7, further comprising at least one pivotable base.

13. The containment device according to claim 12, wherein the at least one pivotable base includes a pair of trap doors which are pivoted to an open position by rotary actuators.

14. The containment device according to claim 7, wherein the lip extends within the slot from one side of the slot to another side of the slot.

15. The containment device according to claim 14, wherein the lip extends on the vertical sidewalls from the one side of the slot to the another side of the slot.

16. The containment device according to claim 7, wherein the protrusions are formed within the lip.

17. The containment device according to claim 7, wherein the detents are offset from the protrusions such that when mated the lower container is offset from an upper container.

18. The containment device according to claim 17, wherein the detents are formed in the lip.

* * * * *